United States Patent
Hofbauer et al.

(10) Patent No.: US 7,333,911 B2
(45) Date of Patent: Feb. 19, 2008

(54) METHOD FOR OPERATING A POSITION-MEASURING DEVICE AND POSITION-MEASURING DEVICE

(75) Inventors: Hermann Hofbauer, Trostberg (DE); Erich Strasser, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/528,890

(22) PCT Filed: Sep. 19, 2003

(86) PCT No.: PCT/EP03/10447

§ 371 (c)(1),
(2), (4) Date: Mar. 23, 2005

(87) PCT Pub. No.: WO2004/031694

PCT Pub. Date: Apr. 15, 2004

(65) Prior Publication Data

US 2005/0273294 A1 Dec. 8, 2005

(30) Foreign Application Priority Data

Sep. 25, 2002 (DE) ................. 102 44 582

(51) Int. Cl.
*G01C 9/00* (2006.01)
(52) U.S. Cl. ............. 702/150; 702/151; 702/158
(58) Field of Classification Search ............. 702/150, 702/151, 158
See application file for complete search history.

(56) References Cited

U.S. PATENT DOCUMENTS 6,097,318 A    8/2000    Hagl et al.
6,265,992 B1   7/2001    Hagl et al.
6,348,695 B2   2/2002    Okamuro et al.
6,806,461 B2  10/2004    Strasser
2001/0001540 A1  5/2001  Okamuro et al.
2002/0195576 A1 12/2002  Inoue et al.

FOREIGN PATENT DOCUMENTS

DE    100 55 488    8/2001
EP    0 660 209     6/1995
JP    11-2515       1/1999

OTHER PUBLICATIONS

Horowitz and Hill, The Art of Electronics, 1989, Cambridge University Press, pp. 495-496.*

* cited by examiner

*Primary Examiner*—John E. Barlow, Jr.
*Assistant Examiner*—Stephen J Cherry
(74) *Attorney, Agent, or Firm*—Kenyon & Kenyon LLP

(57) ABSTRACT

In a method for operating a positional measurement device and a corresponding positional measurement device, the device includes a signal generation unit configured to generate positional data and is connected to sequential or follower electronics by a communication unit. Data is transmitted between the signal generation unit and the communication unit via an internal interface unit, whereas measurement-data request instructions, which are transmitted by the sequential or follower electronics to the positional measurement device, are transmitted to the signal generation unit by bypassing the internal interface unit.

24 Claims, 3 Drawing Sheets

METHOD FOR OPERATING A POSITION-MEASURING DEVICE AND POSITION-MEASURING DEVICE

FIELD OF THE INVENTION

The present invention relates to a method for operating a position-measuring device, as well as a position-measuring device.

BACKGROUND INFORMATION

In position-measuring devices which are used in the automation sector, data is often transmitted between the position-measuring device and a downstream sequential electronics via digital, serial interfaces. In this context, on the side of the position-measuring device, an architecture is provided such that it includes a signal-generating unit which is connected to a communication unit via an internal interface unit. The communication with the sequential electronics in turn takes place via the communication unit. For example, with the aid of the signal-generating unit, analog, position-dependent signals are generated in a conventional manner from the scanning of a suitable measuring graduation and suitably conditioned in order to be transmitted in serial form via the communication unit to the sequential electronics. The internal interface unit is provided in order to be able to flexibly combine greatly differing communication units with greatly differing signal-generating units within the framework of a modular system concept.

In such an architecture, the transmission of a measurement-data request instruction from the sequential electronics to the signal-generating unit and its execution by the signal-generating unit, i.e., the actual measured-value acquisition, must be regarded as fundamentally time-critical. For example, via the measurement-data request instructions, instantaneous positional data are fetched from the position-measuring device for control purposes. To ensure high control performance on the side of the sequential electronics, it is desirable to acquire measurement data, or more precisely, positional data, in a manner as free of delay as possible.

European Published Patent Application No. 0 660 209 describes a position-measuring device to which a processing unit sends commands in the form of data words transmitted in bit-serial fashion, and as a function of these commands, measured position values or parameters are requested from the position-measuring device, or parameters are sent to the position-measuring device.

Furthermore, U.S. patent application Publication No. 2001/0001540 describes a position-measuring device in which, in response to a positional-data request, a measured position value is sent which is based on a measured position value that was already measured at an earlier point in time and mathematically corrected such that it corresponds to the instantaneous position value at the moment of the positional-data request. Disadvantageous in such a position-measuring device is that the accuracy of the measured position values depends upon the accuracy of the parameters needed for the correction, such as the time span between the acquisition of the measured position value and the arrival of a positional-data request, as well as the rate of change of the measured position values (e.g., traversing speed of a machine-tool axis monitored by the position-measuring device).

SUMMARY

In accordance with example embodiments of the present invention, in a method for operating a position-measuring device and a corresponding position-measuring device, within an architecture such as that described above, it may be possible to ensure execution of a measurement-data request instruction on the side of the position-measuring device with as little delay as possible.

According to an example embodiment of the present invention, e.g., with respect to the time-critical transmission to and execution of measurement-data request instructions by the signal-generating unit, it may be provided to bypass the internal interface unit of the position-measuring device and to transmit the corresponding instructions to the signal-generating unit in a manner as free of further time delay as possible. An additional signal-processing time possibly resulting in the interface unit may therefore be avoided for the time-critical measurement-data request instructions. A time-determined execution of measurement-data request instructions may be ensured.

Example embodiment of the present invention may be used in conjunction with varied types of position-measuring devices, regardless of whether they are incremental or absolute position-measuring devices, and regardless of the specific scanning principle and signal-generating principle.

According to an example embodiment of the present invention, a method for operating a position-measuring device connected to sequential electronics via a communication unit, the position-measuring device including a signal-generating unit configured to generate positional data, includes: (a) transmitting data between the signal-generating unit and the communication unit via an internal interface unit; (b) transmitting measurement-data request instructions, transmitted from the sequential electronics to the position-measuring device, to the signal-generating unit to immediately generate measurement data, bypassing the internal interfacing unit; and (c) transmitting the positional data, generated in accordance with the measurement-data request instructions, from the signal-generating unit to the communication unit via the internal interface unit.

According to an example embodiment of the present invention, a position-measuring device, includes: a signal-generation unit configured to generate measurement data; a communication unit, the position-measuring device connected to sequential electronics via the communication unit; an internal interface configured to transmit data between the signal-generation unit and the communication unit; and a redirection device configured to transmit to the signal-generation unit measurement-data request instructions transmitted from the sequential electronics to the position-measuring device to immediately generate measurement data by bypass of the internal interface unit.

According to an example embodiment of the present invention, a position-measuring device includes: signal-generating means for generating measurement data; communicating means, the position-measuring device connected to sequential electronics means via the communicating means; internal interface means for transmitting data between the signal-generating means and the communicating means; and redirection means for transmitting to the signal-generating means measurement-data request instructions transmitted from the sequential electronics means to the position-measuring device to immediately generate measurement data by bypass of the internal interface means.

Further aspects and features of example embodiments of the present invention and details pertaining thereto are described below in the following description with reference to the appended Figures.

DETAILED DESCRIPTION

Figure 1:
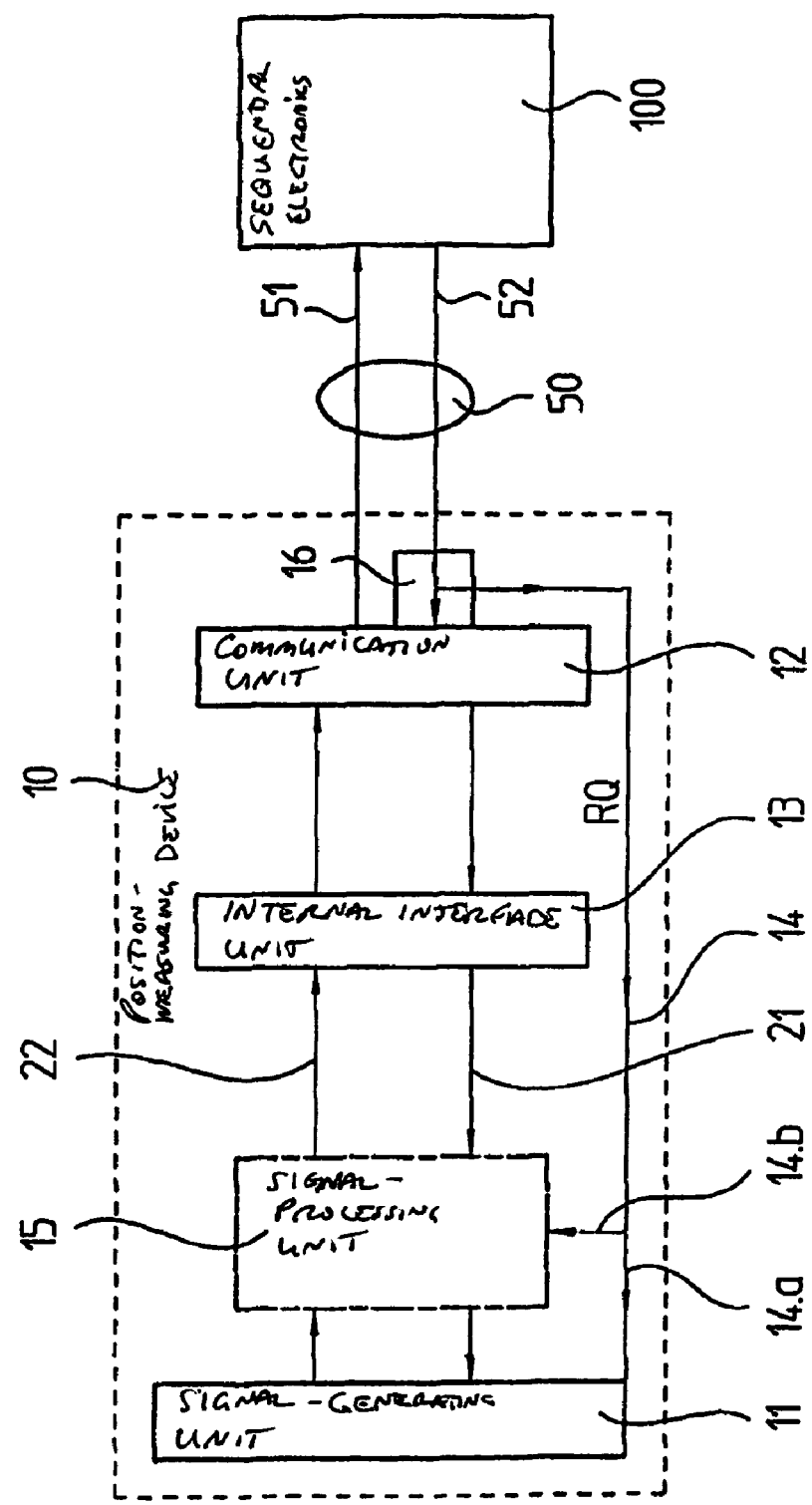
FIG. 1 is a schematic block diagram of a position-measuring device according to an example embodiment of the present invention in conjunction with sequential electronics.

FIG. 1 is a schematized block diagram of a position-measuring device 10 according to an example embodiment of the present invention in conjunction with sequential electronics 100. In this context, for clarity, various components of the overall system are indicated only in highly schematic form.

For example, position-measuring device 10 may be in the form of a conventional incremental or absolute position-measuring system used for determining the position of two objects movable relative to each other, for example, on a machine tool. In such an application, a numerical machine-tool control acts as sequential electronics.

Data is transmitted between position-measuring device 10 and sequential electronics 100 via a data channel 50 in bidirectional, serial form. To that end, data channel 50 includes two first signal-transmission lines 51, 52, indicated in schematic form, via which data is transmitted in the direction indicated by the arrows. In principle, however, data channel 50 may also be constructed differently.

On the side of position-measuring device 10, to handle the data exchange with sequential electronics 100, a schematically indicated communication unit 12 is provided on the input side, which is responsible both for the transmission and the reception of the specific data to and from sequential electronics 100. Communication unit 12 may be constructed differently depending on the interface physics selected or the interface protocol used. That is, example embodiments of the present invention may be used in conjunction with widely varied interface devices and, if desired, bus devices.

In FIG. 1, communication unit 12 is indicated in schematic form as merely a single unit, but in practice may have a markedly more complex arrangement. Thus, in principle, the term communication unit should be understood to include all necessary structural elements and components on the side of the position-measuring device that may be needed for communication with the sequential electronics. In addition to interface-specific protocol components, line drivers, line receivers, transmitters, controllers, clock-data recovery modules, etc., they may include a plurality of further hardware and software elements, right up to the necessary plug-in connections, etc.

To generate the actual measurement data, position-measuring device 10 also includes a signal-generating unit 11, illustrated in schematic form. Via it, measurement data, e.g., positional data, are generated in the position-measuring device. In this context, for example, positional data may be generated from the scanning of a measuring graduation using a scanning unit that is movable relative to the measuring graduation and includes suitable scanning elements. Many different conventional arrangements come into consideration as scanning principles, thus, for example, optical, magnetic, capacitive, inductive scanning, etc., via which in each case position-dependent analog signals are able to be generated. Moreover, the generated positional data may involve widely varied types of positional data, such as, for instance, incremental positional data, absolute positional data, etc. Because of the diverse possibilities for generating the respective positional data, the signal-generating unit is only illustrated schematically in FIG. 1.

Furthermore, signal-processing unit 15, via which the generated—for the most part analog—measurement data or positional data are further processed, may optionally be disposed in respective position-measuring device 10. There are also widely varied possibilities for further processing the generated positional data, depending upon the type of position-measuring device and its application. For example, it may involve signal preprocessing, signal filtering and/or signal matching before, for example, an A/D conversion and subsequent digital signal processing are also carried out. Highly diverse methods may be provided within the framework of a digital signal processing as well, for example, a signal correction, a signal interpolation, a signal monitoring, a signal diagnosis, etc. Because of these varied possibilities for signal processing, signal processing unit 15 is illustrated only schematically in FIG. 1. Consequently, signal processing unit 15 may also include several components.

As indicated above, position-measuring device 10 also includes an internal interface unit 13. Internal interface unit 13 is not to be understood as a physical, but rather as a logic unit which is arranged between signal-generating unit 11 and optional signal-processing unit 15 on one side and communication unit 12 on the other side. Internal interface unit 13 may be effective, e.g., with respect to a modular system arrangement, since many different variants for signal generation may be able to be flexibly combined with the different signal-transmission principles in the direction of sequential electronics 100. In other words: widely different variants of signal-generating units 11 and, if desired, signal-processing units 15 may be flexibly combined with widely different communication units 12, depending on the application.

To that end, in a conventional manner, internal interface unit 13 may be in the form of a bidirectional interface, many different interface architectures again coming into consideration. In FIG. 1, this is illustrated by an addressing channel 21 and a data-transmission channel 22.

It may be provided to transmit, e.g., the time-critical measurement-data request instructions RQ, which are transmitted from sequential electronics 100 via signal-transmission line 52 of data channel 50, to signal-generating unit 11, while bypassing internal interface unit 13, and to bring about their execution, i.e., the measurement-data acquisition, as promptly as possible at the signal-generating unit. As illustrated in FIG. 1, this is accomplished, for example, by transmitting measurement-data request instructions RQ via a separate data channel 14 in the direction of signal-generating unit 11, thus not via internal interface unit 13 otherwise used for signal transmission in position-measuring device 10. For example, separate data channel 14 may be in the form of a separate connecting line which bypasses internal interface unit 13.

As is apparent from the two alternative, separate data channels 14.*a*, 14.*b* illustrated in FIG. 1, provision may be made to send measurement-data request instructions RQ via data channel 14.*a* directly to the signal-generating unit.

Alternatively, it may be possible to send measurement-data request instruction RQ via data channel 14.b to signal-processing unit 15. The latter may be provided, for example, when sequential electronics 100 requests the transmission of measurement data that are derived from the actual positional data. For example, it may involve the measurement data regarding acceleration or jerk that result from the derivation of the positional data. The suitable signal processing and signal conditioning from the positional data is then carried out in signal-processing unit 15.

For the bypassing of communication unit 13 described, it may be necessary to identify measurement-data request instructions RQ in the data stream transmitted by sequential electronics 100 and to separate them. For this purpose, position-measuring device 10 and communication unit 12, respectively, are assigned redirection units in the form of a suitable unit 16 and a separate data channel 14 which takes over this function. In the incoming data stream on signal-transmission line 52, measurement-data request instructions RQ are identified, separated and redirected via data channel 14 in the direction of signal-generating unit 11, bypassing internal interface unit 13. To that end, the separated measurement-data request instructions RQ are suitably conditioned, thus permitting the desired, undelayed transmission to signal-generating unit 11. The delay otherwise resulting in internal interface unit 13 because of the signal-processing time required there may therefore be eliminated based on the measures described herein. Prompt measured-data acquisition may be ensured on the side of position-measuring device 10.

Figure 2:
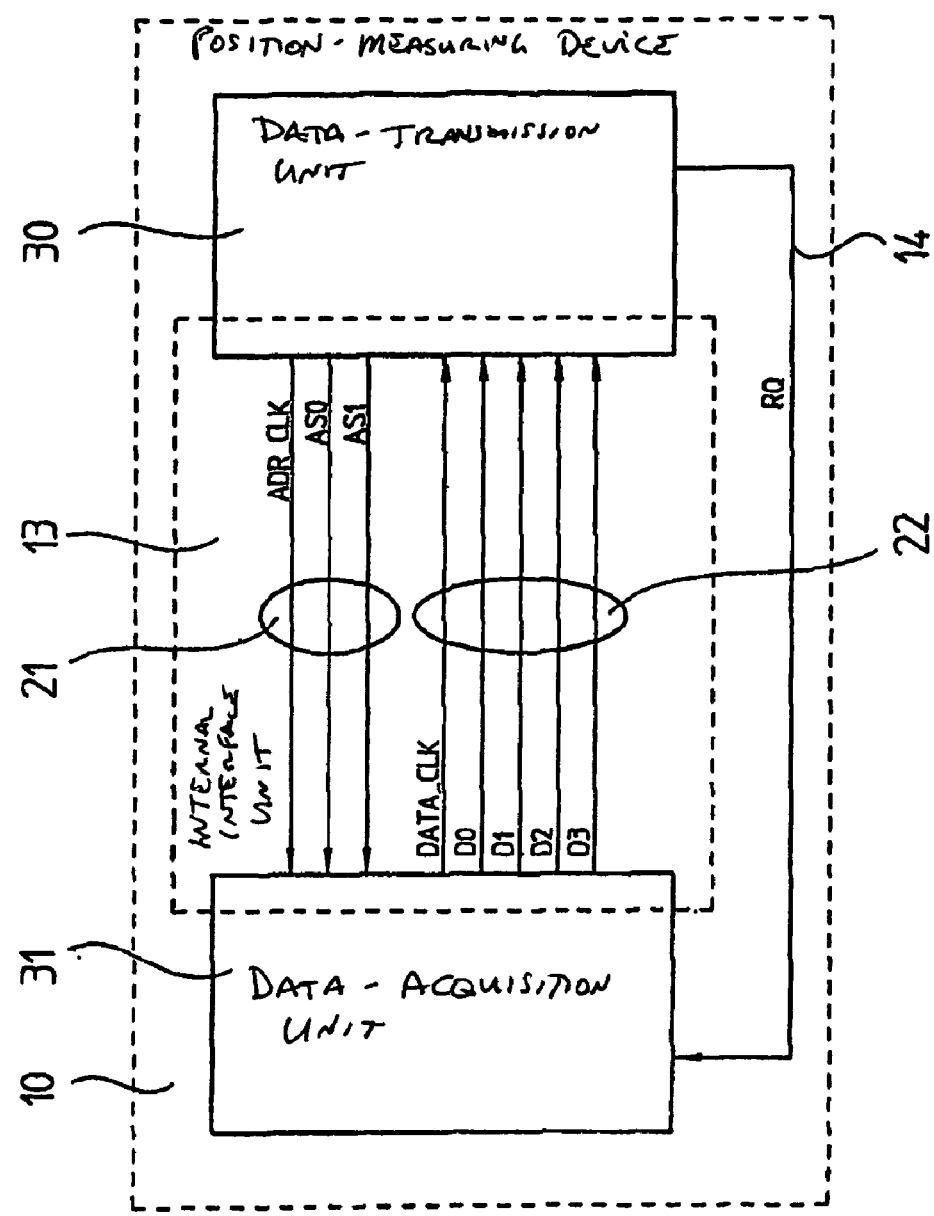
FIG. 2 illustrates a position-measuring device according to an example embodiment of the present invention.

FIG. 2 illustrates an example embodiment of a position-measuring device 10 in more detail. For reasons of clarity, communication unit 12, as well as unit 16 which provides the redirection for measurement-data request instructions RQ, are illustrated as combined in one data-transmission unit 30. Signal-generating unit 11 and optional signal-processing unit 15 are illustrated as combined to form one data-acquisition unit 31. Internal interface unit 13, which, as a logic unit, controls the data exchange between data-transmission unit 30 and data-acquisition unit 31, is only illustrated schematically. For better understanding, identical or similar components are provided with the same reference numerals in all Figures.

Data is transmitted from data-transmission unit 30 to data-acquisition unit 31 via an addressing channel 21. In the reverse direction, thus from data-acquisition unit 31 to data-transmission unit 30, data is transmitted via a data-transmission channel 22.

Addressing channel 21 is used for sending data request instructions and for transmitting parameters from data-transmission unit 30 to data-acquisition unit 31. The data are transmitted synchronously with respect to the clock signal on an address clockline ADR_CLK in the form of serial data packets via n addressing lines AS0-AS(n-1). The number n of addressing lines is arbitrary, powers of the number 2 (1, 2, 4, 8, etc.) generally being selected in data technology. Further criteria are, for example, the complexity of the transmission protocol used, the quantity of data to be transmitted, as well as the number of available connections at the data-transmission modules. In the illustrated example embodiment, n=2 is selected.

In this context, the type of data requested from data-acquisition unit 31 is not limited to positional data or measurement data. Thus, for example, the sending of error messages, warnings and diagnostic values may also be initiated. In addition, parameters which may be necessary for the operation of data-acquisition unit 31, e.g., correction values, may be transmitted via addressing channel 21.

Data-transmission channel 22 is used for transmitting requested data from data-acquisition unit 31 to data-transmission unit 30. For that purpose, m data lines D0-D(m-1), as well as one data clockline DATA_CLK are provided. The number m of data lines may also be arbitrary. Similar selection criteria may be applicable as for the number n of addressing lines. In the example described, m=4.

Data is transmitted on data lines D0-D(m-1) synchronously with a clock signal on data clockline DATA_CLK. In this context, it may be provided that the clock signal of address clockline ADR_CLK, delayed by the signal propagation time in data-acquisition unit 31, is used as the clock signal on data clockline DATA_CLK, since in this manner, a clock signal may easily be obtained for the synchronous data transmission, and therefore it may not be necessary to generate a separate clock signal in data acquisition unit 31. The delay between the clock signal of address clockline ADR_CLK and the clock signal on data clockline DATA_CLK may be very small, and in FIG. 3, is only illustrated by point of time t1', which corresponds to point of time t1 delayed by the signal propagation time.

As described above, measurement-data request instructions RQ are identified from the data stream transmitted by sequential electronics 100, separated and conducted via separate data channel 14 to data-acquisition unit 31. The time gain resulting from this arrangement is illustrated in FIG. 3.

Figure 3:
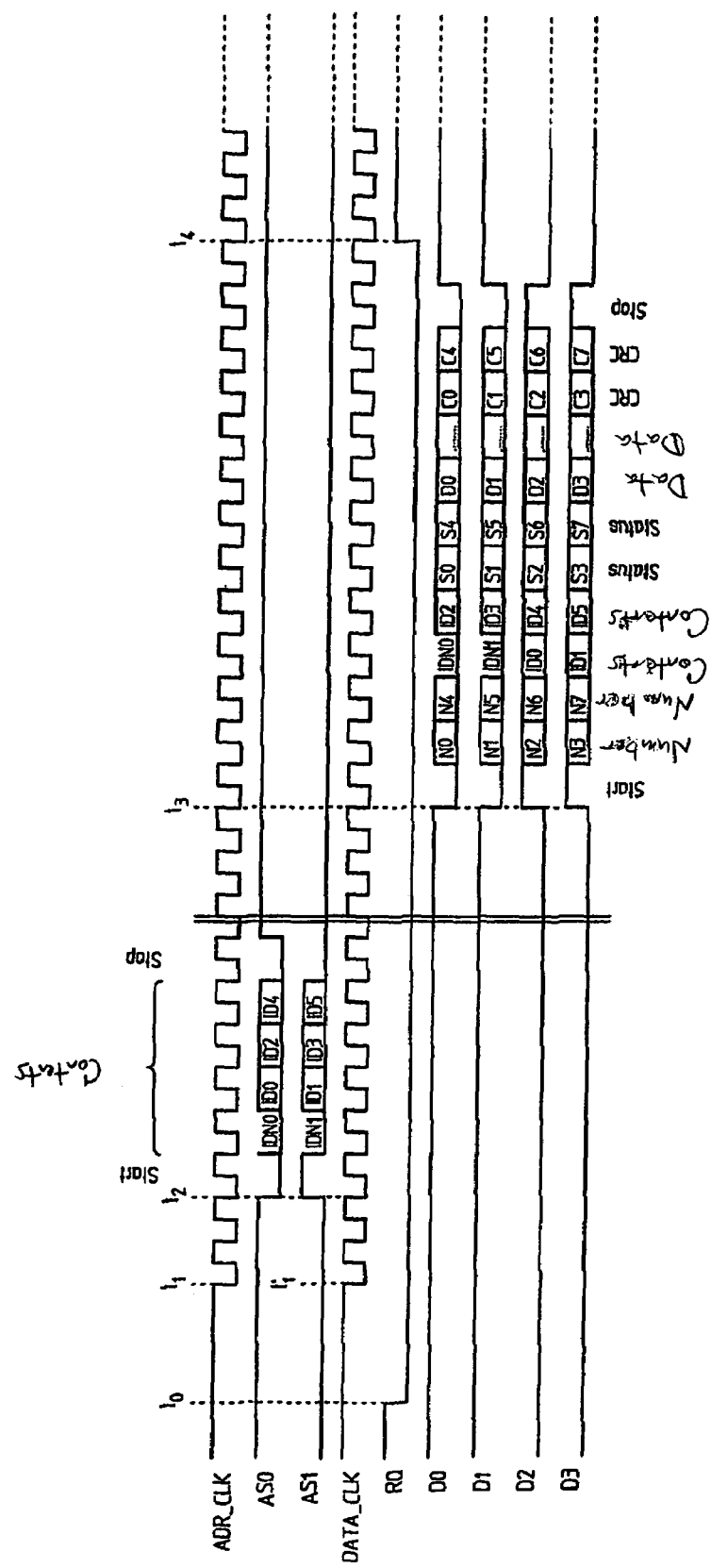
FIG. 3 is a signal diagram of the time sequence of a measurement-data request when working with a position-measuring device illustrated in FIG. 2.

FIG. 3 illustrates a signal diagram of the time sequence of a measurement-data request. First, at point of time t0, a falling edge on separate data channel 14 signals to data-acquisition unit 31 a measurement-data request instruction RQ, and the measurement-data acquisition is started without further time delay. Only after a certain time, which is a function of the processing time in data-transmission unit 30, is a clock signal started on address clockline ADR_CLK at point of time t1. As of point of time t2, a serial data packet having the information about the type of requested data is transmitted from data-transmission unit 30 to data-acquisition unit 31 via lines AS0 and AS1 synchronously with the clock signal on address clockline ADR_CLK.

Since when working with a position-measuring device without the redirection measures as described herein, point of time t1 is the earliest point of time at which a measurement-data acquisition may be started, the time gain of the position-measuring device is calculated from the difference between t1 and t0.

When the requested data is ready in data-acquisition unit 31 at point of time t3, the transmission to data-transmission unit 30 begins via data lines D0-D3 in the form of a serial data packet. Without the measures as described herein, point of time t3 may be delayed by the difference between t1 and t0, i.e., the transmission of data could only begin perceptibly later. As already described, the transmission proceeds synchronously with respect to the clock signal on data clockline DATA_CLK. When the data transmission is ended at point of time t4, a rising edge on separate data channel 14 signals that measurement-data request instruction RQ is executed. At the end of the data transmission, the clock signals on address clockline ADR_CLK and data clockline DATA_CLK are also stopped.

The structure of the serial data packets may be a matter of choice. For example, in addition to the data that is actually to be transmitted, they may also include information concerning the contents and size of the data packet, status information or checksums.

Since the communication between data-acquisition unit 31 and data-transmission unit 30 proceeds on two separate data channels, it is possible to request further data even before the end of the data transmission.

Besides the exemplary embodiments described above, there are other alternative example embodiments within the scope hereof.

What is claimed is:

1. A method for operating a position-measuring device connected to sequential electronics via a communication unit, the position-measuring device including a signal-generating unit configured to generate positional data, comprising:
   (a) transmitting data between the signal-generating unit and the communication unit via an internal interface unit;
   (b) identifying, separating and redirecting measurement-data request instructions in an incoming data stream, transmitted from the sequential electronics to the position-measuring device, without further time delay, to the signal-generating unit to immediately generate measurement data, bypassing the internal interfacing unit; and
   (c) transmitting the positional data, generated in accordance with the measurement-data request instructions, from the signal-generating unit to the communication unit via the internal interface unit.

2. The method according to claim 1, wherein the measurement-data request instructions are redirected in the step (b) to the signal-generating unit via a separate data channel.

3. The method according to claim 2, wherein the measurement-data request instructions are redirected in the step (b) to the signal-generating unit via a separate connecting line.

4. The method according to claim 1, further comprising identifying measurement-data request instructions by the communication unit in a data stream transmitted from the sequential electronics.

5. The method according to claim 4, further comprising separating measurement-data request instructions identified in the identifying step from the data stream sent by the communication unit to the internal interface unit.

6. The method according to claim 5, further comprising conditioning the measurement-data request instructions separated in the separating step so that a transmission to the signal-generating unit occurs substantially free of delay.

7. The method according to claim 1, further comprising requesting, in addition to the positional data, further measurement data derived from the positional data from the position-measuring device via the measurement-data request instructions.

8. The method according to claim 1, wherein the data are transmitted in the step (a) via first channels and the measurement-data request instructions are redirected to the signal-generating unit, bypassing the internal interface unit, via a separate data channel separate from the first channels.

9. The method according to claim 1, wherein the incoming data stream is transmitted from the sequential electronics to the position-measuring device via a signal-transmission line.

10. The method according to claim 1, wherein the measurement-data request instructions are redirected in the step (b) to the signal-generated unit, bypassing the internal interfacing unit and the communication unit.

11. A position-measuring device, comprising:
   a signal-generation unit configured to generate measurement data;
   a communication unit, the position-measuring device connected to sequential electronics via the communication unit;
   an internal interface unit configured to transmit data between the signal-generation unit and the communication unit; and
   a redirection device configured to identify, separate and redirect to the signal-generation unit, without further time delay, measurement-data request instructions in an incoming data stream transmitted from the sequential electronics to the position-measuring device to immediately generate measurement data by bypass of the internal interface unit.

12. The position-measuring device according to claim 11, wherein the redirection device includes a separate data channel between the communication unit and the signal-generation unit.

13. The position-measuring device according to claim 12, wherein the data channel is arranged as a separate connecting line.

14. The position-measuring device according to claim 11, wherein the redirection device includes a unit configured to identify measurement-data request instructions in a data stream transmitted from the sequential electronics and to separate identified measurement-data request instructions from the data stream.

15. The position-measuring device according to claim 11, wherein the communication unit is configured for bidirectional, serial communication between the position-measuring device and the sequential electronics.

16. The position-measuring device according to claim 11, further comprising a further signal-processing device between the signal-generation unit and the internal interface unit configured to process generated positional data.

17. The position-measuring device according to claim 11, further comprising:
   an addressing channel configured for data transmission from the internal interface unit to the signal-generation unit; and
   a data-transmission channel configured for data transmission from the signal-generation unit to the internal interface unit.

18. The position-measuring device according to claim 17, wherein the addressing channel includes an address clockline and n address lines, the addressing channel configured to transmit data synchronously with respect to a clock signal on the address clockline in n-bit wide serial data packets.

19. The position-measuring device according to claim 17, wherein the data-transmission channel includes a data clockline and m data lines, the data-transmission channel configured to transmit data synchronously with respect to a clock signal on the data clockline m-bit wide serial data packets.

20. The position-measuring device according to claim 11, wherein the internal interface unit is in communication with the communication unit and the signal-generation unit via first channels, and the redirection device includes a separate data channel, separate from the first channels, configured to redirect the measurement-data request instructions to the signal-generation unit.

21. The position-measuring device according to claim 11, wherein the sequential electronics are in communication with the redirection device via a signal-transmission line, the incoming data stream is transmitted from the sequential electronics to the redirection device via a signal-transmission line.

22. The position-measuring device according to claim 11, wherein the redirection device is configured to redirect the measurement-data request instructions to the signal-generation unit by bypass of the internal interface unit and the communication unit.

23. A position-measuring device, comprising:
- a signal-generation unit configured to generate measurement data;
- a communication unit, the position-measuring device connected to sequential electronics via the communication unit;
- an internal interface unit configured to transmit data between the signal-generation unit and the communication unit;
- a redirection device configured to transmit to the signal-generation unit measurement-data request instructions transmitted from the sequential electronics to the position-measuring device to immediately generate measurement data by bypass of the internal interface unit;
- an addressing channel configured for data transmission from the internal interface unit to the signal-generation unit; and
- a data-transmission channel configured for data transmission from the signal-generation unit to the internal interface unit;
- wherein the data-transmission channel includes a data clockline and m data lines, the data-transmission channel configured to transmit data synchronously with respect to a clock signal on the data clockline m-bit wide serial data packets, and
- wherein the clock signal on the data clockline includes a clock signal on an address clockline of the addressing channel delayed by a signal propagation time in the signal-generation unit.

24. A position-measuring device, comprising:
- signal-generating means for generating measurement data;
- communicating means, the position-measuring device connected to sequential electronics means via the communicating means;
- internal interface means for transmitting data between the signal-generating means and the communicating means; and
- redirection means for identifying, separating and redirecting to the signal-generating means, without further time delay, measurement-data request instructions in an incoming data stream transmitted from the sequential electronics means to the position-measuring device to immediately generate measurement data by bypass of the internal interface means.

\* \* \* \* \*